April 21, 1942.     H. M. SUTCLIFFE     2,280,457
ILLUMINATED FISHING BOB
Filed Oct. 8, 1940
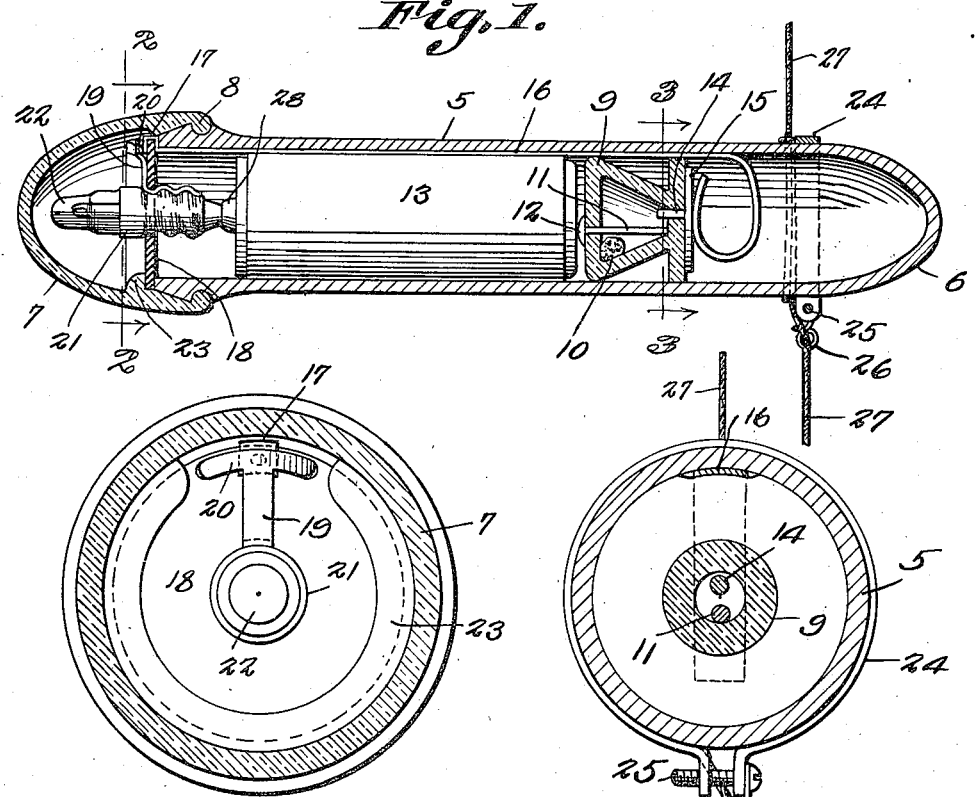
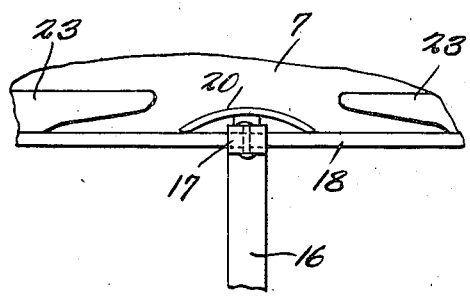
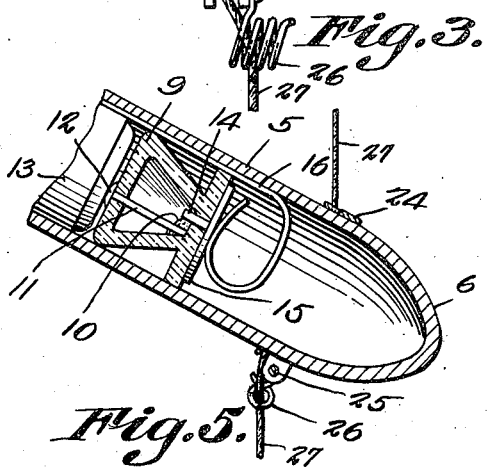
H. M. Sutcliffe
INVENTOR.
BY *CHKnowles*
ATTORNEYS.

Patented Apr. 21, 1942

2,280,457

UNITED STATES PATENT OFFICE 2,280,457

ILLUMINATED FISHING BOB

Harry M. Sutcliffe, National City, Calif.

Application October 8, 1940, Serial No. 360,325

3 Claims. (Cl. 43—17)

This invention relates to fishing bobs, the primary object of the invention being to provide a fishing bob having illuminating means controlled by a pull directed to the fishing line connected therewith, by the action of fish caught on the hook, thereby rendering the bob visible in the dark.

An important object of the invention is to provide a bob of this character wherein the electric lamp and lighting means forming a part thereof, will be contained in a casing in the form of a float, the float being balanced so that the electric circuit to the lamp will be normally broken, means being provided for automatically completing the circuit to the lamp, illuminating the lamp, when one end of the float is pulled downwardly, by the action of the fish caught on the hook used with the float.

A further object of the invention is to provide adjustable means whereby the float will be actuated under various degrees of pulling force, thereby providing a bob which may be used when fishing for large or small fish.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a longitudinal sectional view through an illuminated bob, constructed in accordance with the invention.

Figure 2 is a sectional view taken on line 2—2 of Figure 1.

Figure 3 is a sectional view taken on line 3—3 of Figure 1.

Figure 4 is a fragmental elevational view illustrating the contact bar providing the circuit between the switch and lamp, as connected with the lamp-supporting disk, of the bob.

Figure 5 is a fragmental sectional view through the switch end of the bob, illustrating the mercury as engaging the contacts to complete a circuit.

Referring to the drawing in detail, the bob comprises a tubular body portion indicated generally by the reference character 5, one end thereof being closed and rounded as at 6. An annular groove is formed in the opposite end of the body portion 5, the surface of the body portion between the groove and open end of the body portion being beveled as clearly shown by Figure 1 of the drawing.

A translucent closure 7 is provided to close the open end of the body portion, the closure 7 being formed with an annular enlargement 8 fitted in the groove frictionally holding the closure in position, and providing means whereby the closure may be readily removed, permitting access to the interior of the body portion.

The switch member which is of the mercury type, is indicated by the reference character 9 and comprises a body portion which is substantially cone-shaped and hollow, providing a compartment with inclined walls, for the mercury, which is indicated at 10. A contact member 11 extends into the body portion of the switch 9, and is provided with a contact head 12 adapted to engage one end of the battery 13. Another contact member 14 extends into the mercury switch, and is so disposed with respect to the contact member 11, that when the body portion 5 is tilted in one direction, the mercury 10 will roll to a position to complete a circuit between the contact members 11 and 14. A disk indicated at 15 connects with the contact member 14, and provides a contact surface against which one end of the contact bar 16 engages, the opposite end of the contact bar extending upwardly to a point beyond the open end of the body portion, where it is formed with an offset portion that is fitted over one edge of the insulated disk 18 providing a contact member 17. Associated with the contact member 17, is a contact member 19 that extends over the disk 18 and passes through a central opening, formed in the disk, the contact member 19 being constructed to conform to the shape of the threads formed on the lamp socket 21, fitted in the central opening of the disk 18, to complete a circuit therethrough, when an electric lamp is positioned therein. Connected to the outer end of the contact member 19, is a contact arm 20 which is curved as shown by Figure 4, to bridge the contact member 17 under normal conditions. The contact member 19 provides a circuit with the contact bar 16 supplying electric energy to the lamp 22 fitted in the lamp socket 21. The inner end of the lamp 22 is shown as resting against the contact point 23 of the battery 13.

Formed integral with the closure or cap 7, is a rib 23 that extends inwardly from the inner surface thereof, the ends of the rib 23 being spaced apart. The lower surfaces of the ends of the ribs are beveled, as shown by Figure 4, so that when the cap or closure 7 is rotated, the rib will ride over the contact member 20, forcing the contact member 20 downwardly moving the member 20 into engagement with contact member 17 completing a circuit.

When the bob is to be placed in use for fishing, the cap or closure 7 is rotated to complete the circuit as described, so that when the body portion is tilted in fishing, the circuit to the lamp 22 will be completed. When the bob is not in use, the cap or closure is moved to the position as shown by Figure 4, to maintain the circuit broken if the mercury moves to engage the contacts 11 and 14, while the bob is being carried. The reference character 24 indicates a split ring which is positioned around the body portion, and is supplied with a screw 25 that extends through openings in the ends of the split ring, securing the split ring in position on the body portion.

Thus it will be seen that the split ring may be readily and easily adjusted longitudinally of the body portion 5. Secured to the split ring 24, and held in position by means of the screw 25, is an eye member 26 which is made up of a length of coiled wire, the eye being connected to the body portion 5 by securing the end thereof to the body portion, at a point opposite to the lamp end of the body portion. The fishing line is passed between the loops of the eye where it is held by frictional contact therewith, to the end that the line 27 may be adjusted to vary the distance between the body portion and hook secured to the line 27. Thus it will be seen that due to the manner of connecting the fish line to the bob, when a pull is directed to the line 27 at a point beyond the split ring 24, or the point where the fish hook is connected to the fish line, the closed end of the body portion will be pulled downwardly, causing the mercury to roll to the low end of the mercury switch, completing the circuit to the lamp, causing the lamp to light.

By adjusting the split ring 24, the angle at which the body portion must be moved to operate the mercury switch, may be changed, thereby adapting the bob for use in catching large or small fish. By moving the split ring 24 towards the closed end of the body portion, the sensitivity of the mercury switch, may be increased so that comparatively small fish may operate the bob to light the lamp.

What is claimed is:

1. An illuminating fishing bob comprising a tubular body portion, an electric lamp mounted in one end of the body portion, a battery within the body portion and in circuit with the lamp, a mercury switch within the body portion and embodying a casing in the form of a hollow cone-shaped member, contacts in the contracted end of the cone-shaped member, mercury within the hollow cone-shaped member and adapted to move into engagement with the contacts completing the circuit and lighting the lamp when the body portion tilts a predetermined degree, and means for connecting a fishing line to said body portion.

2. An illuminating fishing bob comprising an elongated hollow body portion, an electric lamp in one end of the body portion, a battery in the body portion and in circuit with the lamp, a manually controlled switch in the circuit adapted to normally break the circuit, and a circuit including a mercury switch in the body portion adapted to close the circuit to the lamp when the manually controlled switch is closed and when the body portion is tilted in a predetermined direction.

3. An illuminating fishing bob comprising an elongated hollow body portion, an electric lamp mounted in one end of the body portion, a battery in the body portion, a circuit between the lamp and battery, a manually controlled switch in the circuit, said switch embodying a stationary contact member and a movable contact member, a cap fitted over the lamp, cams carried by the cap and adapted to move into engagement with the movable contact member forcing the movable contact member into engagement with the stationary contact member, completing a circuit, a mercury switch disposed within the body portion and providing a circuit between the battery and lamp, and said mercury switch being adapted to operate to complete a circuit to the lamp when the first mentioned switch has been operated to close the circuit between the battery and lamp.

HARRY M. SUTCLIFFE.